March 9, 1965 O. ASSMANN 3,172,182
PRESS FOR MAKING BRIQUETTES FROM MATERIAL
IN THE POWDER OR GRANULAR FORM
Filed Sept. 13, 1962 16 Sheets-Sheet 2

INVENTOR
OTTO ASSMANN
BY
*Malcolm W. Fraser*
ATTORNEY

March 9, 1965  O. ASSMANN  3,172,182
PRESS FOR MAKING BRIQUETTES FROM MATERIAL
IN THE POWDER OR GRANULAR FORM
Filed Sept. 13, 1962  16 Sheets-Sheet 3
FIG.3
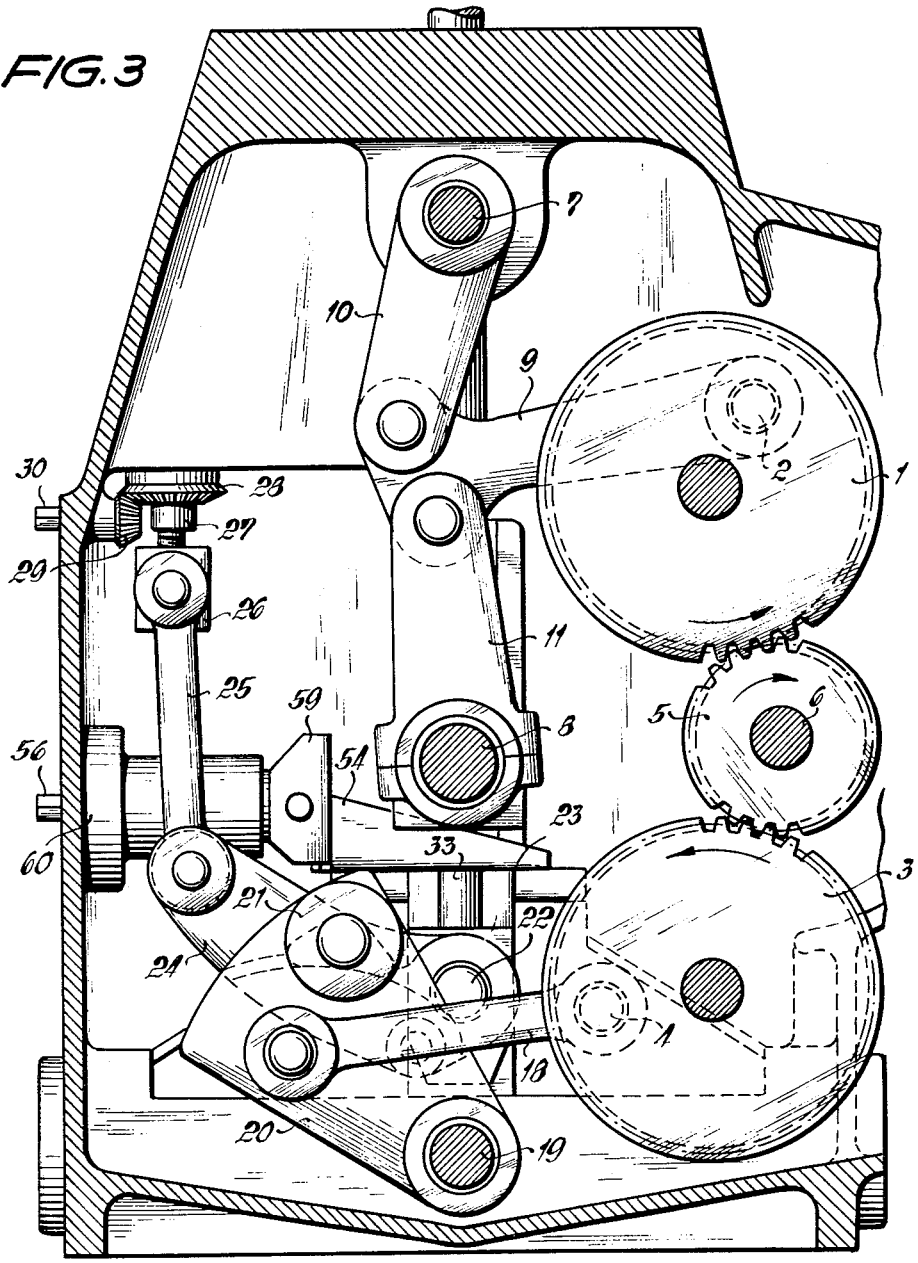
INVENTOR
OTTO ASSMANN
BY 
ATTORNEY March 9, 1965     O. ASSMANN     3,172,182
PRESS FOR MAKING BRIQUETTES FROM MATERIAL
IN THE POWDER OR GRANULAR FORM
Filed Sept. 13, 1962     16 Sheets-Sheet 9

INVENTOR
OTTO ASSMANN
BY
Malcolm W. Fraser
ATTORNEY

March 9, 1965 O. ASSMANN 3,172,182
PRESS FOR MAKING BRIQUETTES FROM MATERIAL
IN THE POWDER OR GRANULAR FORM
Filed Sept. 13, 1962 16 Sheets-Sheet 13

INVENTOR
OTTO ASSMANN
BY Malcolm W. Fraser
ATTORNEY

INVENTOR
OTTO ASSMANN

ATTORNEY 3,172,182
PRESS FOR MAKING BRIQUETTES FROM MATE-
RIAL IN THE POWDER OR GRANULAR FORM
Otto Assmann, Kochel am See, Bavaria, Germany,
assignor to Dorst-Keramikmaschinen-Bau, Inh.: Otto
Dorst und Dipl.-Ing. Walter Schlegel, Kochel am See,
Bavaria, Germany, a corporation of Germany
Filed Sept. 13, 1962, Ser. No. 223,316
Claims priority, application Germany, Oct. 21, 1961,
D 37,291
9 Claims. (Cl. 25—98)

The present invention relates to a press for making briquettes from material in the powder or granular form in a continuous operation.

An object of this invention is to provide a press for the continuous manufacture of briquettes which can be used whenever dry, pulverised materials or granulated, composite powders are to be pressed into solid briquettes of a variety of shapes and if necessary of high density.

A further object is to provide a press useful in sintered metal techniques. While the production of briquettes from ceramic materials in powder form, iron oxide powders or carbides, require press pressures of up to about 1000 kg./cm.$^2$, rough-pressing forces which are very slight and withdrawing forces for lifting the pressed briquette out of the press mold of up to 20% of the requisite press pressure in the case of high briquettes, with the use of metal powders and similar materials in sintered metal techniques the requisite press pressures are considerably higher and lie in the region of 10 t./cm.$^2$. In the case of high briquettes the withdrawing power can be as much as 100% of the pressure applied by the upper die or ram. Rough pressing requires a force of about 10 to 25% of the requisite press pressure. The present press is designed to give, in a rapid and fully automatic sequence of operations, the high forces required during pressing, withdrawal and rough-pressing in a precise and strictly defined course of pressing motions.

A still further object is to provide a press in which the separate working movements transmitted to the press tools are produced from a common main shaft but are individually adjustable in simple and convenient fashion. The synchronous coupling with the main or drive shaft of the machine is entirely mechanical and all hydraulic control mechanisms are avoided since these cannot without great difficulty be made to provide strictly defined sequences of movement with synchronised operation.

An additional object is to provide a press in which the press tools can be speedily replaced, thus allowing for economical production of small quantities of briquettes.

Other objects, novel features and advantages of this invention will become apparent from the following description of a preferred embodiment and the accompanying drawings, wherein:

FIGURE 3 is a section through the machine housing as shown in FIGURE 1, but with the toggle mechanism displaced through an angle of 15° before the pressing position of the upper die or ram and the withdrawing mechanism displaced through the same angle and with the synchronously occurring working motion of the machine set for the greatest withdrawing path;

Figure 16:
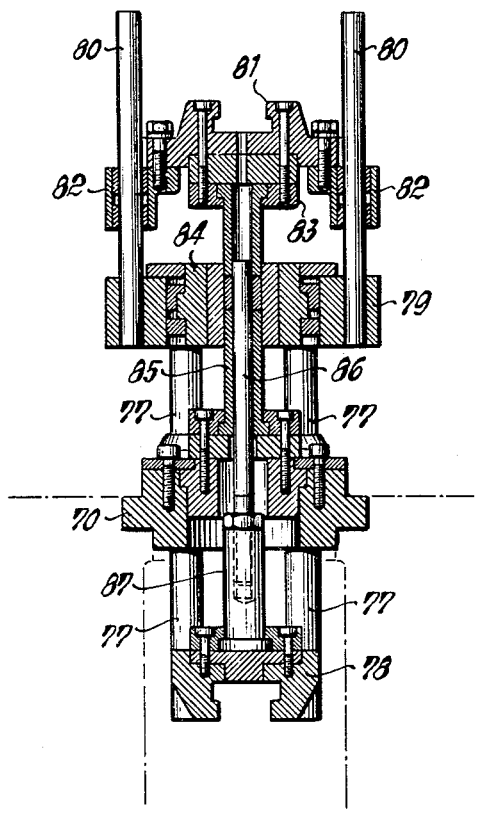
Figure 17:
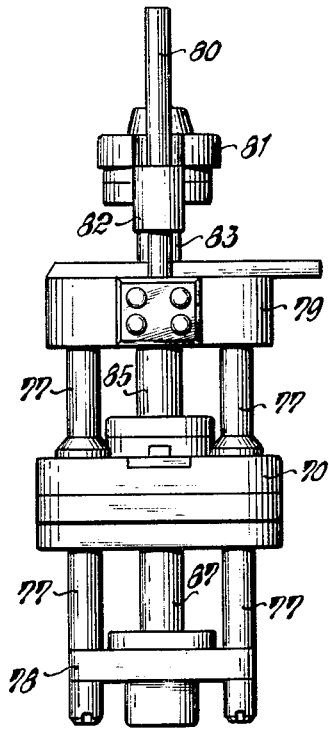

FIGURE 16 is a frontal section through the tool holder, showing the tool casing, the base plate, the bottom coupling plate and the connecting rods and the guide system for the upper die of the press tool comprising guide rods located at the sides in the tool casing, and further indicating the location of the press tool in the machine, and FIGURE 17 is a side view of the press tool holder as shown in FIGURE 16.

Figure 1:
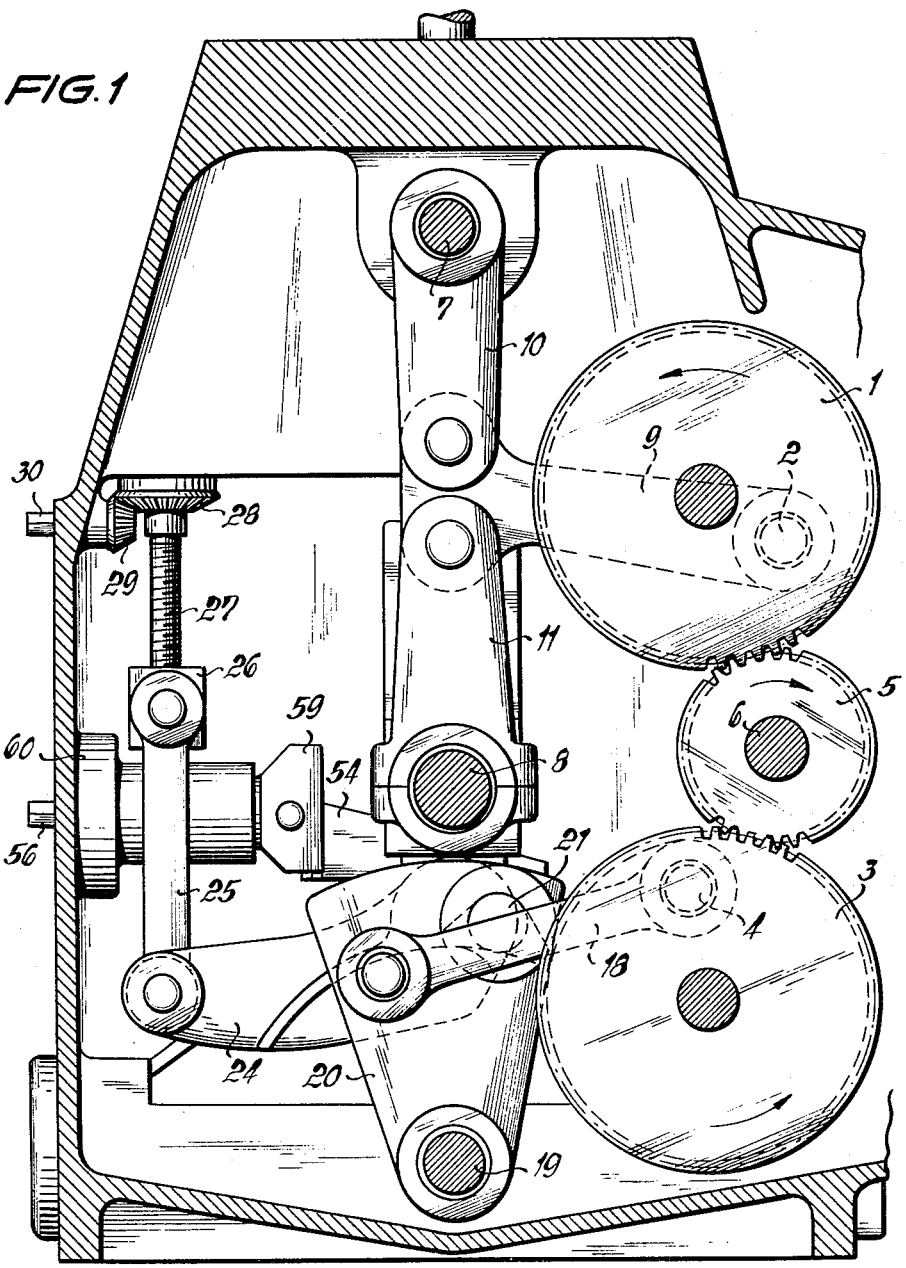
FIGURE 1 is a vertical side section taken through the machine housing, showing the toggle mechanism in the pressing position, the toggle drive, the main driving shaft of the machine and part of the withdrawing mechanism with drive.
Figure 2:
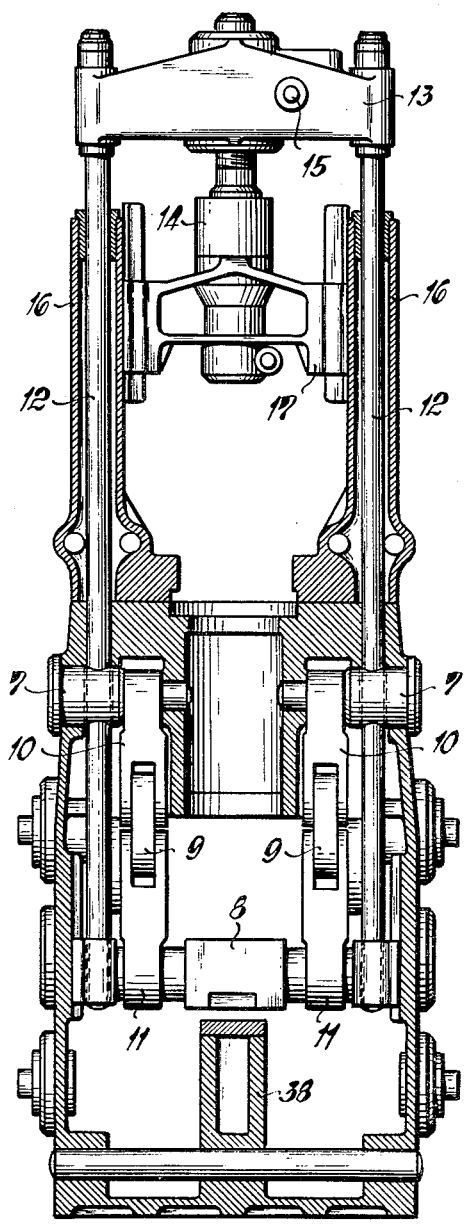
FIGURE 2 is a vertical frontal section taken through the machine housing and the machine pillars showing the suspension of the toggle joints and of the toggle-operated cross piece which is adjustably connected by means of connecting rods with the upper die or ram cross piece.

Referring now to the drawings, and in particular to FIGURE 1, a paired arrangement of gear wheels 1 with cranks 2 and gear wheels 3 with cranks 4 are driven by a main shaft 6 through intermediate gear wheels 5 synchronously and in the directions indicated by the arrows. Cranks 2 actuate two toggle joints which are opposite each other end which are suspended from pins 7 and hinged on a toggle-operated cross piece 8 and comprise driving rods 9 and links 10 and 11, and force the toggle-operated cross piece 8, which is mounted to move vertically in slide-guides in the machine housing, to carry out continuous travel movements. The two toggle-joints suspended from pins 7 at each side are shown in FIGURE 2. The toggle-operated cross piece 8 is connected to an upper die cross piece 13 by two connecting rods 12 so that continuous and unchanging travel movements are transmitted to upper die carriage 17 which is arranged to move vertically on machine pillars 16 and can be vertically adjusted by means of crank 15 acting through spindle 14.

The cranks 4 on the gear wheels 3 (FIGURES 1 and 3) transmit their motion through connecting rods 18 to actuate two withdrawing levers 20, which are mounted opposite each other on pins 19, and causes them to carry out continuous and invariable reciprocating movements. The crank drives cranks 2 for actuating the toggle joint and the cranks 4 for the withdrawing mechanism are synchronised in their motions by the gearing arrangement including gear wheels 1 and 3.

A sliding block 21 (FIGURE 1) with an arcuate slide face is mounted to rotate in a hub in each withdrawing lever 20. As this lever 20 rocks or oscillates, the sliding block 21 slides over a corresponding arcuate slide face on one of two levers 24 which are mounted to pivot about pins 22 in the withdrawing cross piece 23. These levers 24 are pivotally connected by two connecting rods 25 to a block 26 which has adjusting screw threads so that when a spindle 27 is turned by means of a crank on pin 30 acting through a pair of bevel gears 28 and 29, the levers 24 are raised (FIGURE 3) and thus the arcuate slide faces on the levers 24 are shifted relative to the reciprocating movement of the sliding blocks 21.

During the periodic oscillating movements of the levers 20, the withdrawing cross piece 23, which is connected to the levers 24 by pins 22, is lowered into the withdrawing position in accordance with the withdrawing path which can be adjusted by means of the spindle 27. Thus, at the end position of the oscillating movement, the withdrawing mechanism has assumed the desired withdrawing position. When the lever 30 returns from this end position, the withdrawing cross piece 23, and consequently the withdrawing device, is returned to the filling position, to be defined below, under the action of two compression springs 31 (FIGURE 4) which are pivotally mounted to the machine housing and are hinged to the withdrawing cross piece 23; the sliding blocks 21 meanwhile slide over the slide faces on the levers 24. It is thus apparent that the withdrawing path of the withdrawing device can be controlled in accordance with the degree of inclination of the levers 24, which is set by means of the spindle 27 from zero to the maximum withdrawing path.

Figure 5:
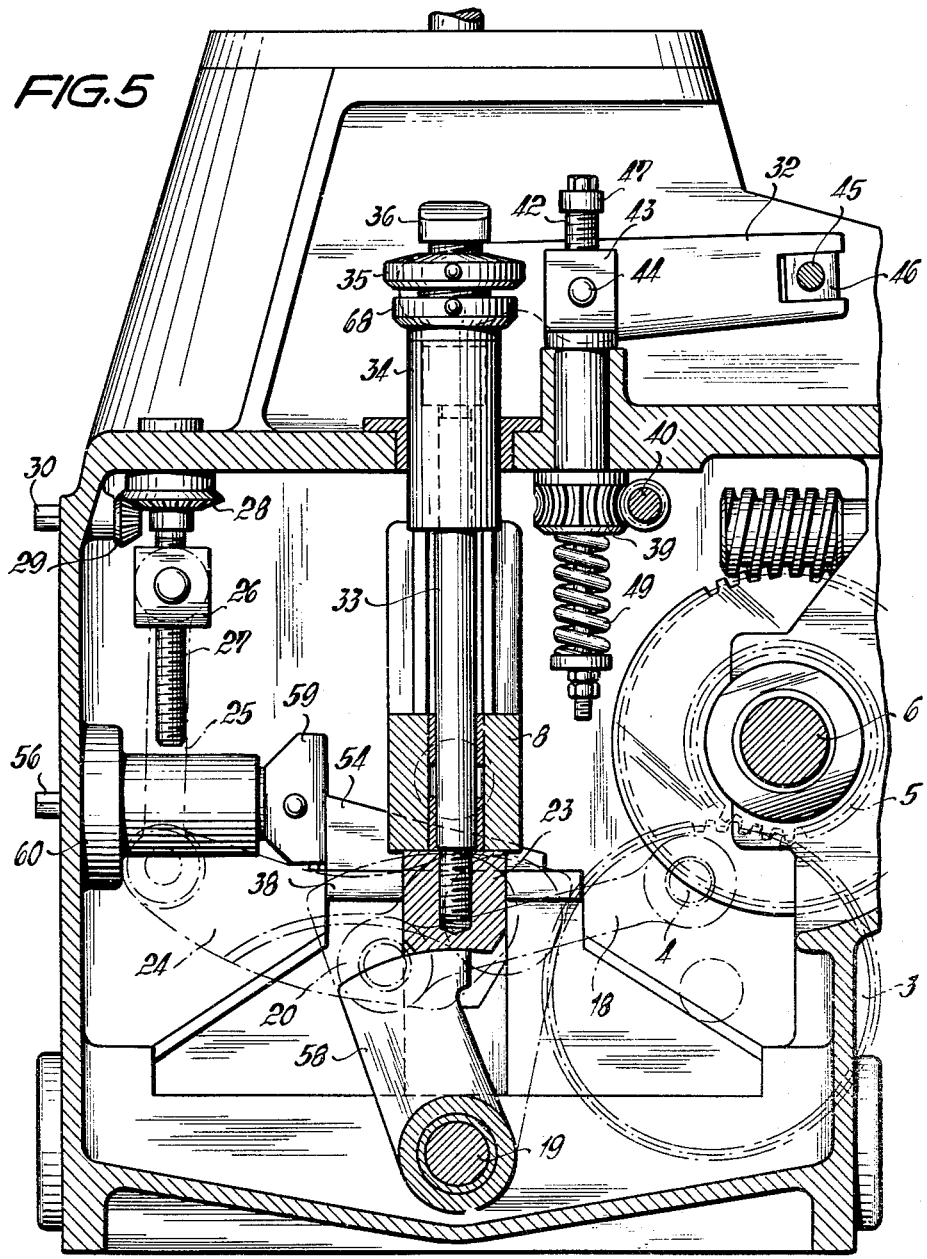
FIGURE 5 is a vertical side section through the machine housing, showing the toggle-operated cross piece in section and the withdrawing mechanism in its neutral position, supported by the locking device of the withdrawing mechanism.

FIGURE 5 shows the withdrawing mechanism, composed of the withdrawing cross piece 23 and an adjusting block 34 which are connected together through connecting rods 33, screw thread bushing 35 and coupling pins 36, in the pressing position. The connecting rods 33 are mounted in sliding bearings in the bent lever cross piece 8 and the adjusting block 34 is mounted in a bearing in the machine housing to allow for vertical movement. Compression springs 31 (FIGURE 6) are disposed opposite each other at the same angle and are mounted in aperture bearings 37 in the machine housing. These springs support the withdrawing cross piece 23 and thus press the withdrawing mechanism vertically upwardly until the adjusting block 34 comes to bear against adjustable levers 32 of the device for setting the pressing path. The pressing position is fixed in such a manner that the upper surface (a) of the withdrawing cross piece 23 becomes level with the upper surface of a divided bridge 38.

Figure 7:
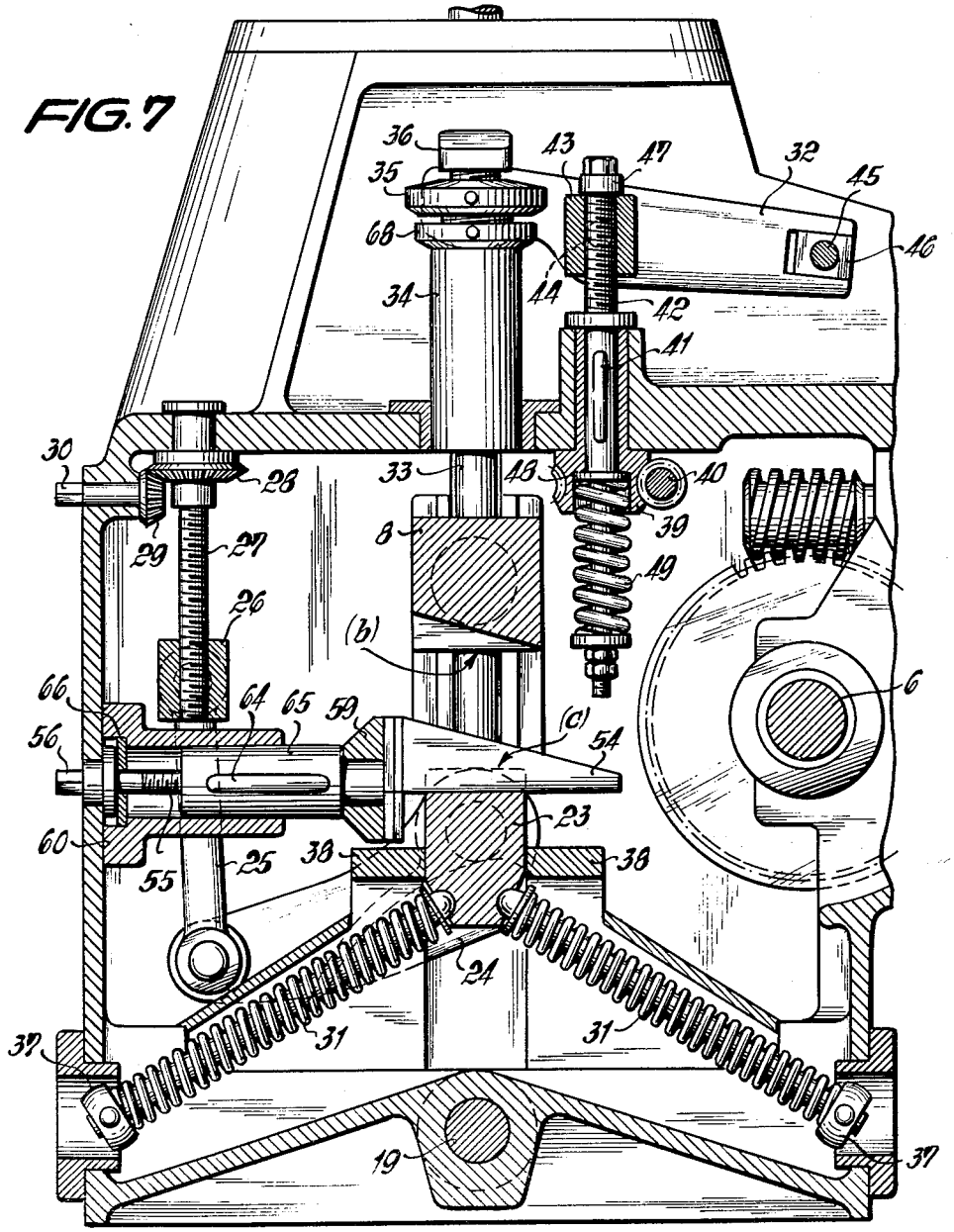
FIGURE 7 is a vertical side section through the machine housing as shown in FIGURE 6 but with the withdrawing mechanism in the filling position when the upper die or ram and the toggle-operated cross piece is at its highest position and the rough-pressing mechanism is at maximum adjustment.

FIGURE 7 shows the construction of the mechanism for setting the pressing path which includes a bushing 39 which is mounted for rotation in the machine housing and has a worm gear toothing, worm 40 which is externally actuated, a screw-threaded spindle 42 carried by the bushing 39 by means of a fitting key 41 and has restricted vertical movement, a bracket 43 with adjusting screw thread and the levers 32. The levers 32 are hinged to the bracket 43 by means of pins 44 and are pivotally mounted to the machine housing on pins 45 having sliding blocks 46. By turning the worm gear 40 by an externally disposed crank handle, it is possible to shift the bracket 43 vertically until it bears against a disc 47. The levers 32 are thus raised and consequently allow for a variation of the vertical position of the withdrawing mechanism from the pressing position to the maximum setting for the pressing path.

A compression spring 49 extending between a stop on the screw-threaded spindle 42 and a disc 48 prevents any additional vertical movement of the spindle 42 under normal conditions. However, this construction of the device for setting the pressing path allows the set limitation for the pressing path to be exceeded for a short time when the spring force is overcome. At this point it should be particularly noted that the limit for the pressing path is identical with the setting for the filling height for the press tool which is being used. When the press tool is incompletely filled, which can be caused by badly flowing material or very flat tool molds, such a fault can be obviated by exceeding the set filling space for a short time.

Figure 8:
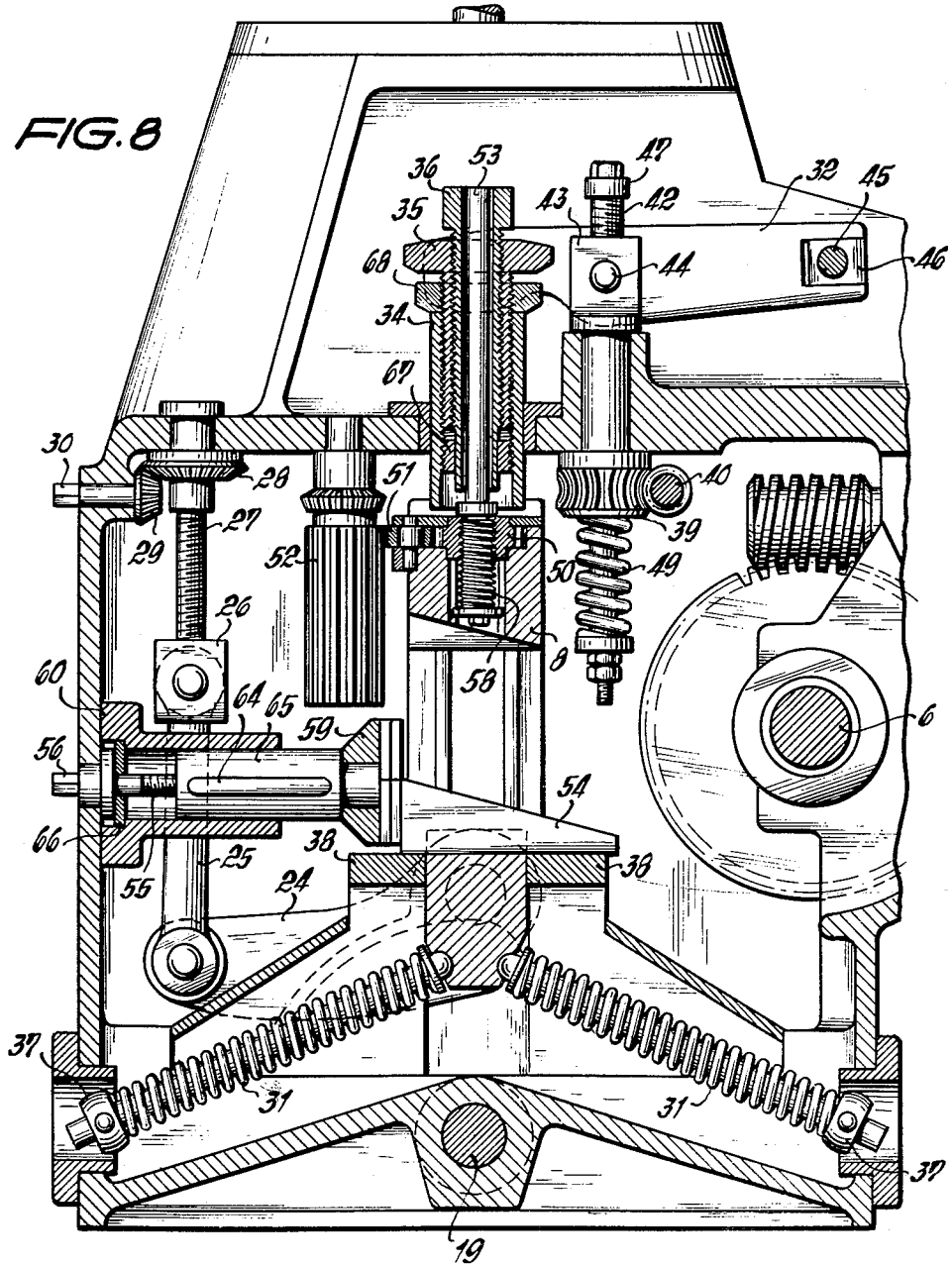
FIGURE 8 is a vertical side section through the machine housing as shown in FIGURES 4 to 6 and through the prefilling mechanism with drive, the withdrawing mechanism being at its neutral position and the toggle-operated cross piece at its highest position.

For the purposes of over-filling (prefilling) there is provided in the toggle-operated cross piece 8, as shown in FIGURE 8, a pin 53 which can be vertically shifted by means of gear wheel 50 which has an inside screw thread, intermediatee gear wheel 51 and guide bushing 52 which has gear wheel toothing. By turning the guide bushing 52 by means of an external crank handle and a pair of bevelled wheels, it is possible to lift the pin 53, which is normally flush with the surface of the coupling pin 36 at the highest position of the toggle-operated cross piece 8, to such an extent that it protrudes, so that when this pin strikes the coupling plate of the press tool, the force of the compression spring 49 may be overcome and the withdrawing device lifted until the toggle-operated cross piece 8, and thus the upper die of the machine, has exceeded its normal highest position. In this operating phase, the filling space of the press tool is filled during the prefilling operation by means of an automatic filling device and when the over-charge has subsided, the filling space is levelled off by the filling shoe to the precise volume required.

The installation of the vertically adjustable pin 53 not only serves for producing over-filling, but also makes the press suitable for calibration work in the ejection process. To this end the pressing movements of the withdrawing device, the filling path, the withdrawing path and the prepressing path are set at neutral position. When the pin 53 strikes the lower tool across piece during the upward movement of the bent lever cross piece 8 to its highest position, the pin 53 lifts the calibrated briquette from the tool mold. The tool ram is lowered during the return movement of the pin 53, which is caused by the lowering of the bent lever cross piece 8, by means of compression or tension springs built into the press tool. As has already been stated, the return movement of the withdrawing device from the withdrawing position to the pressing position is controlled by the force of the compression springs 31 and the guiding of the sliding blocks 21 on arcuate slide faces on the levers 24 when the withdrawing levers 20 make their return swing. The further upward movement of the withdrawing device beyond the pressing position and into the filling position is effected as the withdrawing levers 20 continue their swing, whereupon the sliding blocks 21 are lifted from the slide faces on the levers 24 by rollers on the withdrawing cross piece 23 and the upward movement of the withdrawing device is guided by guide faces on the withdrawing levers 20 so that control for this movement is provided right up to the highest filling position.

A particular mode of operation is provided by the arrangement of the two opposing compression springs 31 (FIGURES 4, 6, 7 and 9), the so-called recuperating springs, which are hinged to the withdrawing cross piece 23 at the same angle. Owing to the constant variation of the angle of inclination of these recuperating springs during the working movements of the withdrawing device and their consequent changes in length and thus in load, their lifting force over the distance covered by the vertical movements is approximately constant. Whilst the vertical components of the force of the recuperating springs summate, the horizontal components counteract each other.

The working movements of the withdrawing device are composed of the pressing path, the withdrawing path and the return movement. The pressing path constitutes the downward movement during the consolidating process of the briquette from the set filling position to the neutral position or pressing position. The withdrawing path constitutes a further downward movement and is necessary for lifting the pressed briquette from the mold. It extends from the pressing position to the set withdrawing position and corresponds to the height of the briquette plus the distance of penetration of the upper ram into the mold. The return movement occurs after withdrawal of the briquette and brings the withdrawing device back into its original position, that is, the filling position of the press tool being used. The method of producing this return movement has already been discussed and it was noted that this movement is controlled by elements in the withdrawing drive right up into the upper end position, that is, the filling position. One of the main features of the machine according to the invention is the control of the pressing movement. After the ram has entered the mold, it is necessary on commencement of the consolidating process for the press tool, which is coupled to the withdrawing mechanism by means of pins 36 (FIGURE 5), to carry out a downward movement corresponding to the downward movement of the ram. This movement begins at the set filling position and ends at the pressing position.

When sintered metals are being pressed, the tensile forces occurring during the consolidating process and necessary for the completion of the downward movement of the press tool can amount to about 70% of the pressing pressure of the ram in the last stage of consolidation, especially when no use is made of rough-processing, to be described below. When appropriate use is made of rough-pressing, these tensile forces vary between about 10 and 25% of the pressing pressure used.

The present invention discloses a new arrangement for producing these variable pressing movements by means of the continuous travel motion of the ram and the toggle-operated cross piece 8. FIGURE 7 shows the machine in the filling position when the pressing path is set at its greatest. The withdrawing cross piece 23 has been lifted from the pressing position, in which it lies in the same plane as the divided bridge 38, to project beyond this bridge by the distance of the maximum setting. At this angle of rotation of the machine, the toggle-operated cross piece 8, in combination with the ram cross piece 13, is in its highest position. A wedge 54, resting on the surface of the withdrawing cross piece 23, serves for effecting rough-pressure. If no use is made of rough-pressing, this wedge 54 is drawn back into the zero setting in the direction of the arrow by turning a crank handle on the pin 56 which in turn rotates the screw-threaded spindle 55 to make the wedge 54 ineffective. With this setting of the rough-pressing device, the course of the pressing motion is as follows.

Figure 6:
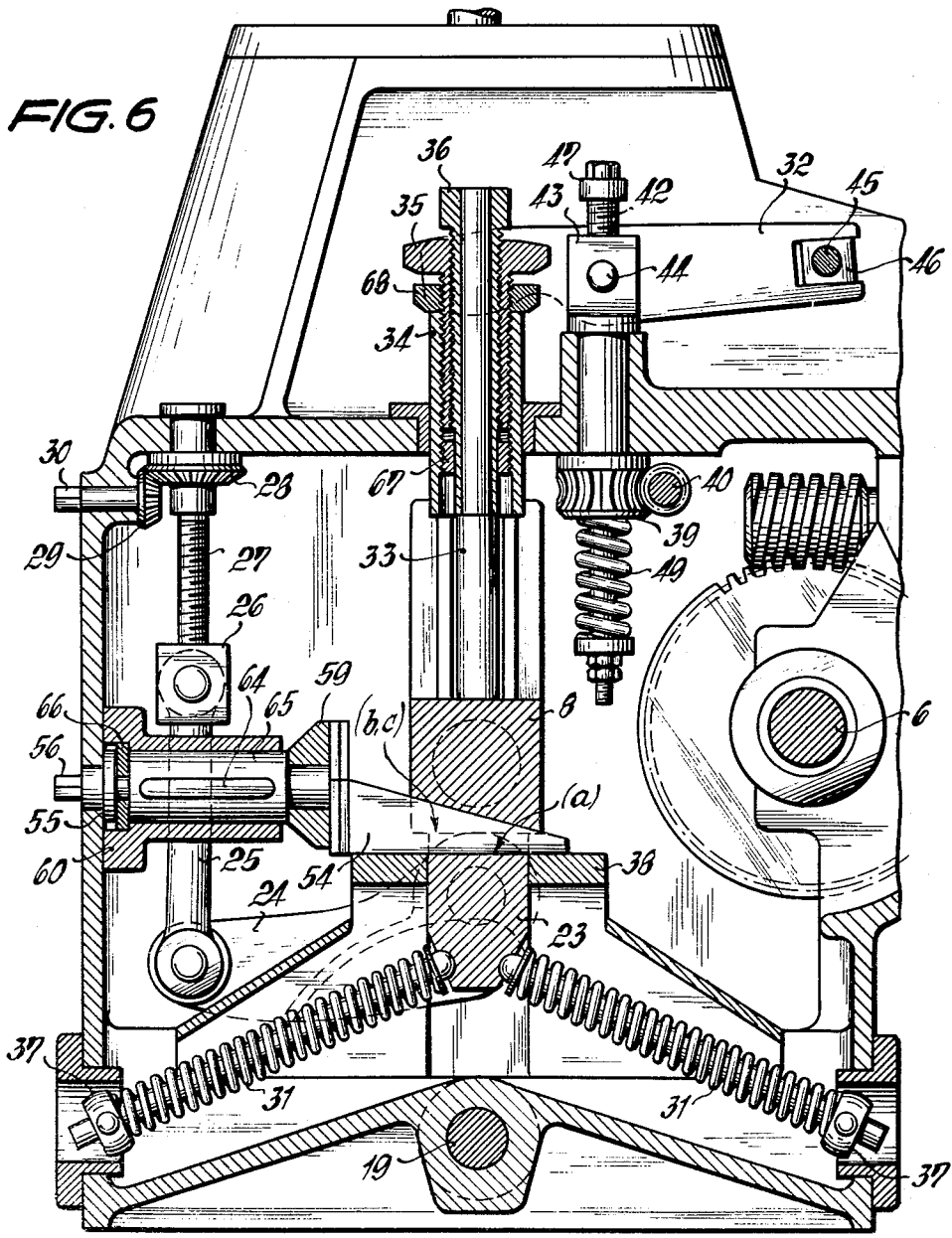
FIGURE 6 is a vertical side section through the machine housing as shown in FIGURE 4 but with the section taken through the withdrawing cross piece and the structure of the rough-pressing mechanism, showing the rough-pressing wedge in the pressing position, or neutral position, of the rough-pressing mechanism.

As the toggle-operated cross piece 8 (FIGURE 7) descends, its under surface, indicated my (b), strikes the upper surface (c) of the withdrawing cross piece 23 and forces the withdrawing device with the press tool casing, which is coupled thereto by the screw-threaded pins 36, to move in synchronism and load the recuperating springs 31 to take up the pressing position as shown in FIGURE 6. In this position, which also marks the lowest position of the toggle-operated cross piece, the pressing movement and, if no rough-pressing is done, the consolidating process is ended. This pressing position of the withdrawing device, being dependent on the end position of the toggle-operated cross piece 8, is invariable.

As a rule, the press tools for the withdrawing process are constructed in such a manner that the stationary press rams located in the press mold exhibit the profile for the briquette to be produced. In such cases, the vertically movable press bushing is a casing which is strained only by the surface friction of the material to be pressed and, due to this, takes an active part in the pressing function produced by its own imparted motion. However, it is sometimes necessary, for example when collar bushings or similar briquettes are being made, for the collar of such a compact to be included in the movable press bushing. This measure results in the casing being loaded by a very considerable ram pressing pressure. If the pressure acting on this collar section is greater than the opposing force of the surface friction, the withdrawing device, which is coupled to the press tool, might so load the recuperating springs 31 as to be pressed into a position beyond the pressing position. To prevent this, the withdrawing cross piece 23 (FIGURE 5) has slide faces on its under surface at both ends, these slide faces being arcuate and concentric with the axis of the bearing pin 19. The withdrawing levers 20, which are mounted for rotation about the pins 19, are fixedly attached to a supporting lever 58. During the continuous reciprocating motion of the withdrawing mechanism, these levers support the withdrawing cross piece 23 and thus prevent it from descending beyond the pressing position. After the toggle-operated cross piece 8 has passed its lowest position and the ram has thus been lifted from the briquette, but before withdrawal, i.e. the further downward movement of the withdrawing cross piece 23, has commenced, these supporting levers 58 are swung out of the path of the cross piece 23. The withdrawing movement can now be carried out unhindered. The pendulum movements of the withdrawing levers 20 cause the slide faces on the supporting levers 58 to be brought back into the path of the withdrawing cross piece 23 only when the withdrawing device is carrying out the subsequent pressing movement.

The method of pressing described above, in which the pressing movements of the ram and the press tool casing are the same once the ram has entered the press mold and in which both movements reach their pressing positions at the same time, produces adequately uniform consolidation only with very shallow compacts. With deeper briquettes the bottom portion is more compressed than the top portion. This can be traced to the fact that the forces caused by the surface friction of the materials occur during the consolidating process as additional components of the pressing pressure. The greater the depth of a briquette, the more these forces become effective and the greater the difference in density between the top and bottom surfaces of the pressed briquette. The requisite measures for equalising the density are effected in the machine according to the invention by a process known as rough-pressing.

The pressing operation is effected as before after entry of the ram in the press mold with synchronous movements of the ram and the withdrawing device. The interception of the rough-pressing device, however, causes the press tool casing to reach its pressing position earlier than the ram. As a result, while the press tool casing remains in its pressing position, the ram continues to descend to carry out final consolidation, especially of the upper portion of the briquette. The path for this so-called rough-pressing can usually be regulated continuously from 0 to 15 mm.

Figure 4:
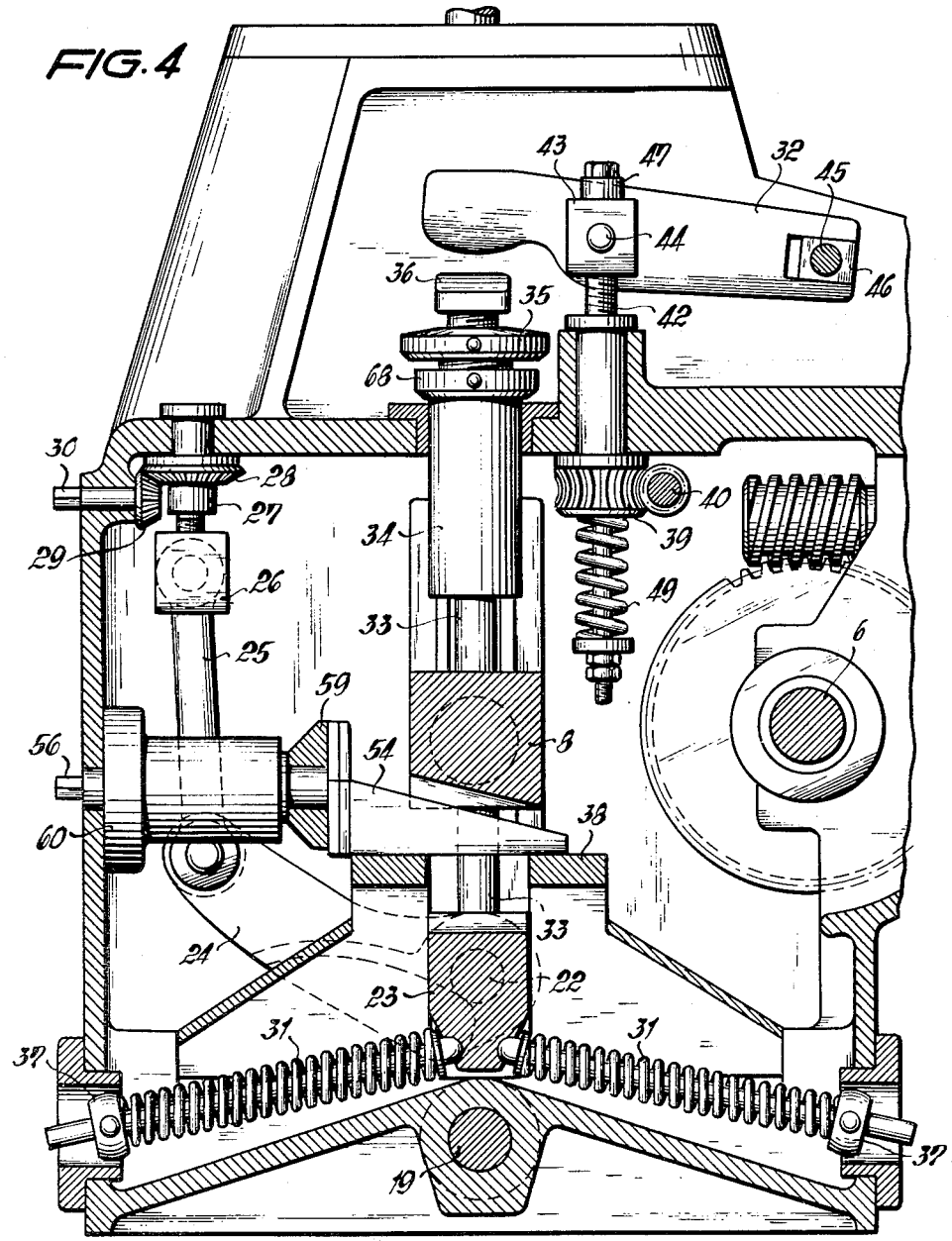
FIGURE 4 is a vertical side section through the machine housing, showing the withdrawing position of the withdrawing mechanism, the neutral position of the rough-pressing mechanism as the toggle-operated cross piece returns, corresponding to the angle of rotation of the machine with synchronously occurring motion.
Figure 9:
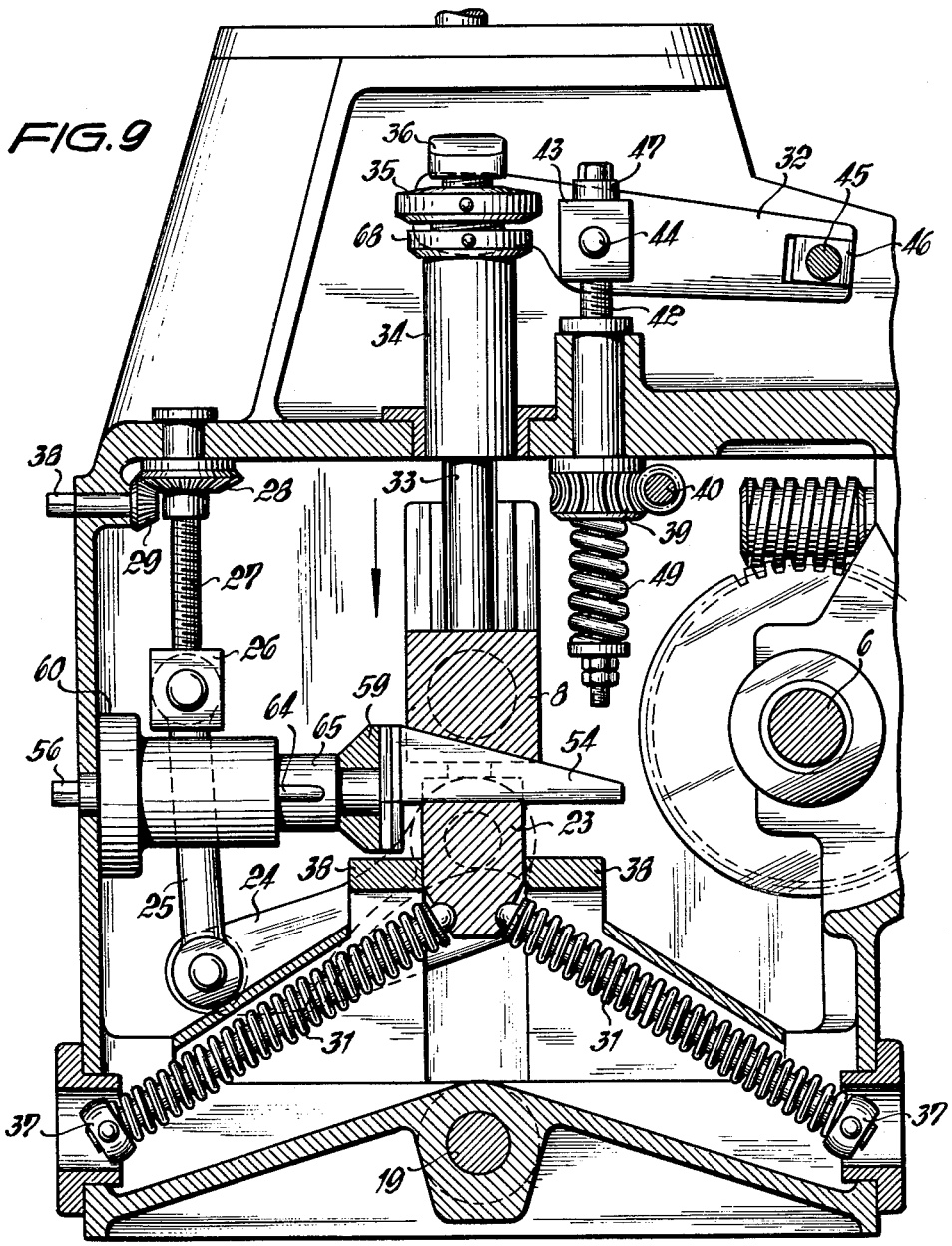
FIGURE 9 is a vertical side section through the machine housing as shown in FIGURES 4 to 7, showing the toggle-operated cross piece displaced in the direction of the arrow and at a position immediately before the commencement of the rough-pressing motion, which occurs when the toggle-operated cross piece makes contact with the rough-pressing wedge.
Figure 10:
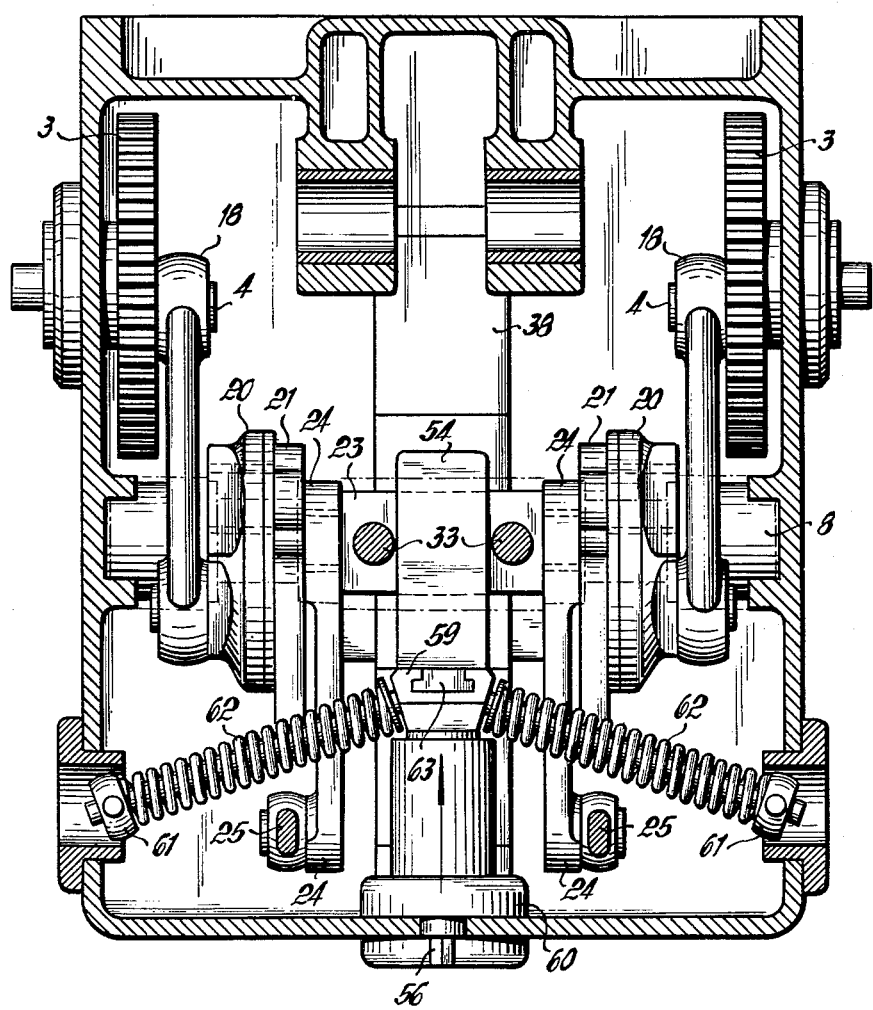
FIGURE 10 is a horizontal section through the machine housing, showing the arrangement of the bilaterally mounted withdrawing mechanism and the rough-pressing mechanism including compression springs mounted to the machine housing and hinged to the hammer of the rough-pressing mechanism.

In FIGURES 6 and 10 the rough-pressing device is shown partly in section. It comprises a rough-pressing wedge 54, a hammer 59, a guide bushing 60 for the hammer 59, the screw-threaded spindle 55 and a compression spring 62; these latter are arranged on each side of the device and pivotally mounted to the machine housing in aperture bearings 61 and hinged to the hammer 59. The wedge 54 is coupled in the horizontal direction to the hammer 59 by means of the T-shaped guide strip 63 which can slide in its corresponding groove in the vertical direction. A hammer pin 65 is slidably mounted in the guide bushing 60 and secured against rotation by a fitting key 64 and is pressed in the direction of the arrow (FIGURE 10) by the compression springs 62 hinged to the hammer. The screw-threaded spindle 55, in conjunction with a screw-threaded bushing which is inserted in the bore of the hammer pin 65 and secured against rotation by fitting keys, limits the advance of the hammer 59: this screw-threaded bushing rests against the collar of the hammer pin and the screw-threaded spindle 55 is blocked by the disc 66. The position of the hammer 59 can be adjusted from zero to the maximum setting for the rough-pressing device by means of a crank handle on the pin 56 for turning the screw-threaded spindle 55. Whilst the wedge 54 is shown in FIGURE 4 in its zero or neutral position, FIGURE 7 shows the rough-pressing device at its maximum setting. The rough-pressing operation is further described in detail with reference to FIGURES 7, 9, 11 and 12.

Figure 11:
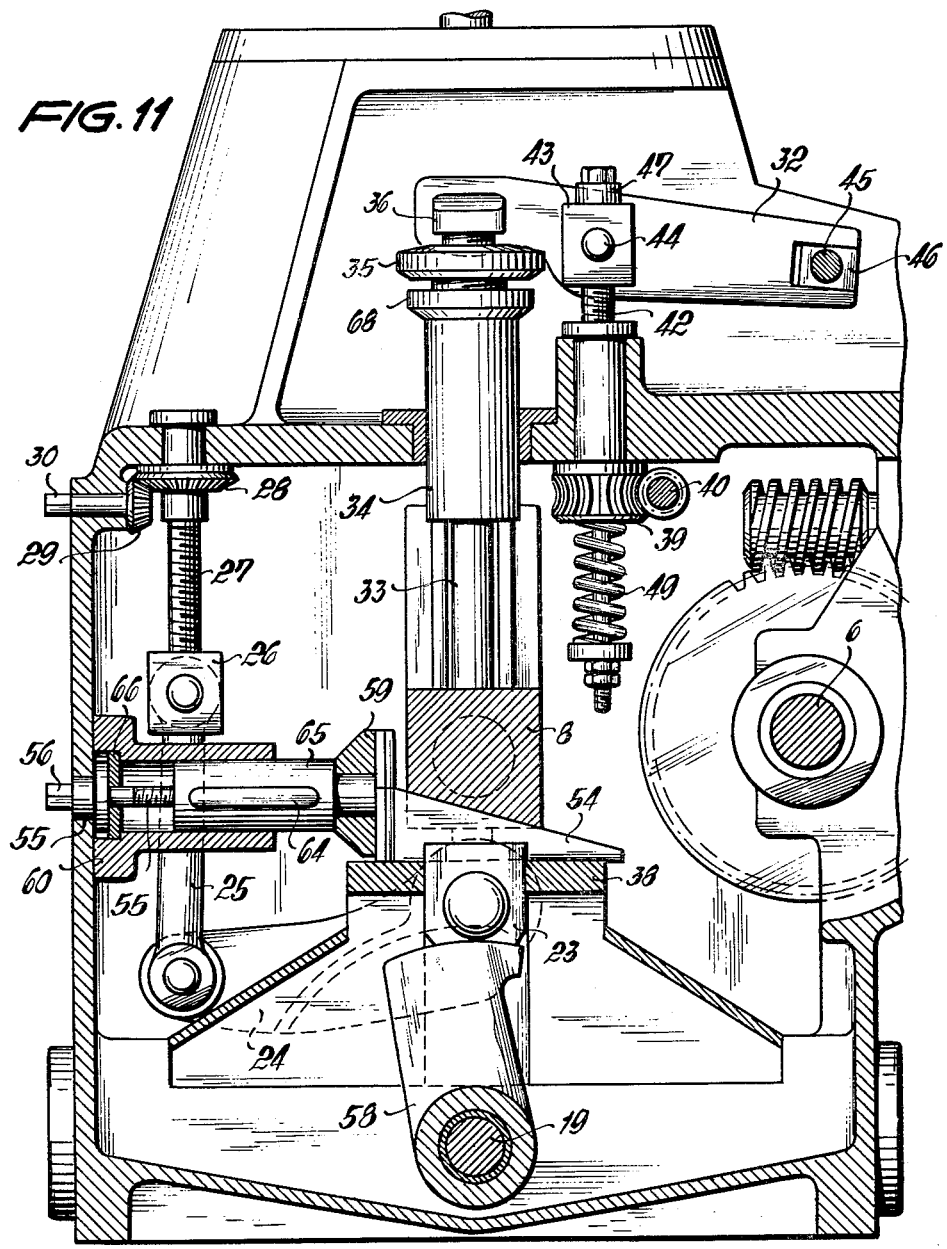
FIGURE 11 is a vertical side section through the machine housing, showing the rough-pressing mechanism at the end of the rough-pressing motion and a view of the withdrawing mechanism supported in the pressing position.

FIGURE 7 shows the toggle-operated cross piece 8 in its highest position. At this angle of rotation of the machine the withdrawing cross piece 23 is in the filling position corresponding to the set pressing path of the press tool. The wedge 54 resting on the slide face of the withdrawing cross piece 23 has previously been raised from the two-piece bridge 38 during the return motion of the withdrawing apparatus, being guided by the hammer 59. The under surface of the toggle-operated cross piece 8 is an inclined plane at that part directly above the wedge 54, its angle of inclination being equal to the angle of the wedge 54. During the downward movement of the toggle-operated cross piece 8, its under surface strikes the wedge 54, as shown in FIGURE 9, to force the withdrawing device to load the recuperating springs 31 to take up the pressing position, the movements of the ram and tool casing being in synchronism. This end position is achieved when the wedge 54 rests on the surface of the divided bridge 38 (FIGURE 11). The shallow-angled wedge 54, together with the compression springs 62, is capable of bearing forces amounting to about 25% of the maximum ram pressure of any given machine. This force is exceeded by the wedge 54 striking the stationary divided bridge 38. With the maximum rough-pressing setting the ram would now be 15 mm. from its lowest position. As the toggle-operated cross piece continues to descend, the force loading the wedge 54 is increased, because the wedge now rests on the stationary divided bridge 38. The wedge 54 thus loads the compression springs 62 and slides to the side. The forces occurring in this operation diminish considerably because of the friction now occurring due to the motion of the wedge. In the lowest position of the toggle-operated cross piece 8, i.e. the pressing position of the ram, the wedge 54 has attained its end position, which is also the neutral position for the rough-pressing device.

Figure 12:
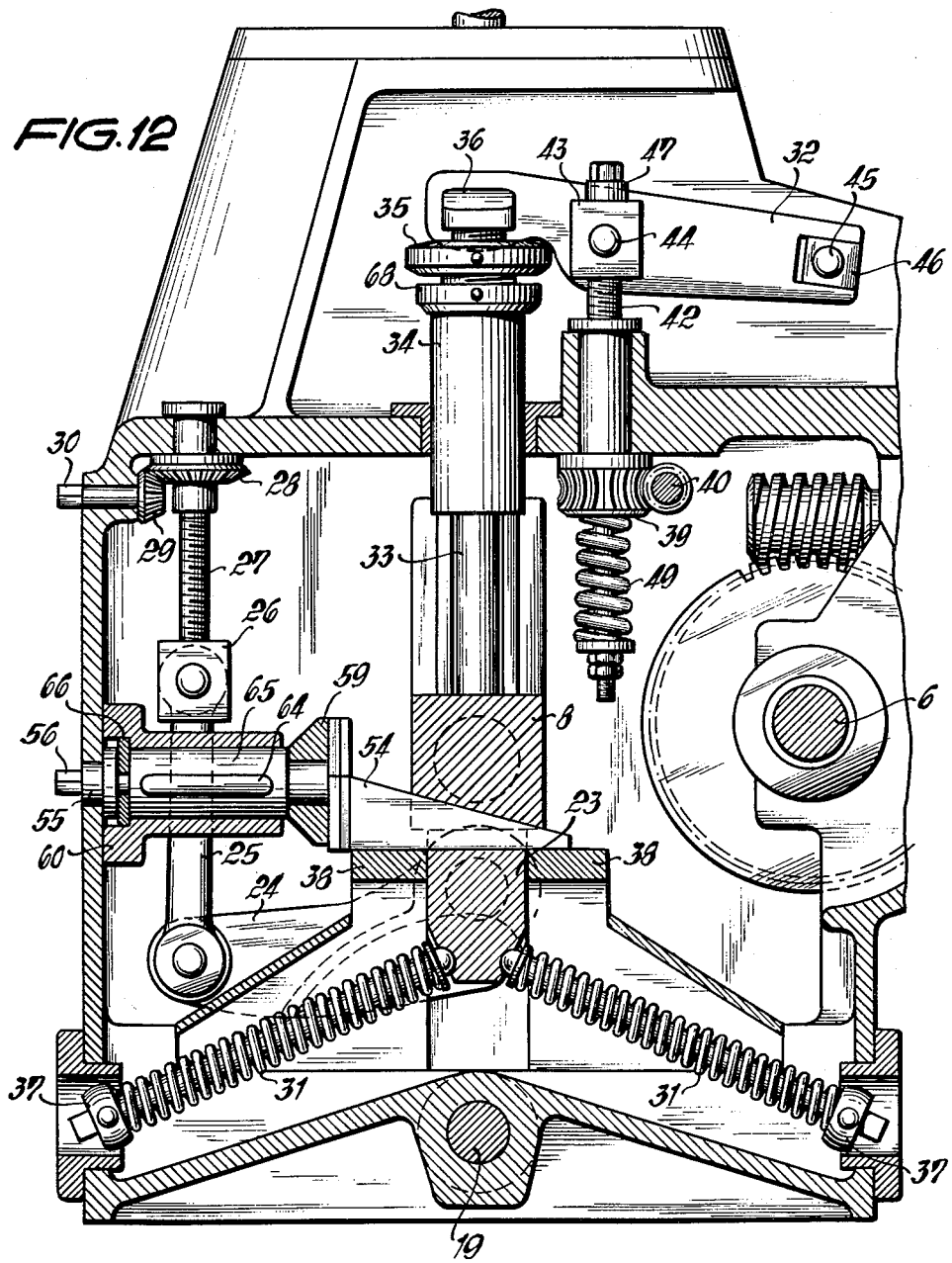
FIGURE 12 is a vertical side section through the machine housing with the withdrawing mechanism and the toggle-operated cross piece in the pressing position after consolidation. The rough-pressing wedge has returned to the neutral position of the rough-pressing mechanism.

As shown in FIGURE 12, as the wedge 54 slides back into its neutral position and the withdrawing cross piece 23 remains stationary, being supported by the lever 58, the ram effects the final consolidation of the briquette in accordance with the motion of the toggle-operated cross piece 8. As stated above, this rough-pressing operation can be effected through a path ranging from zero to 15 mm. according to the setting of the rough-pressing device, this setting being effected by means of a crank handle on the pin 56. The setting distance provided is sufficient for the production of high briquettes and is equal to up to 20% of the total height of the briquette. When the lowest or pressing position of the ram has been passed, the wedge 54 slides under the action of the compression springs 62 (FIGURE 10) under the rising toggle-operated cross piece 8 and thus acts as a means for preventing the withdrawing cross piece 23, supported by the compression springs 31, from rising until the lever 58 withdraws and the withdrawing movement commences, when the withdrawing cross piece 23 is guided into the withdrawing position.

Figure 13:
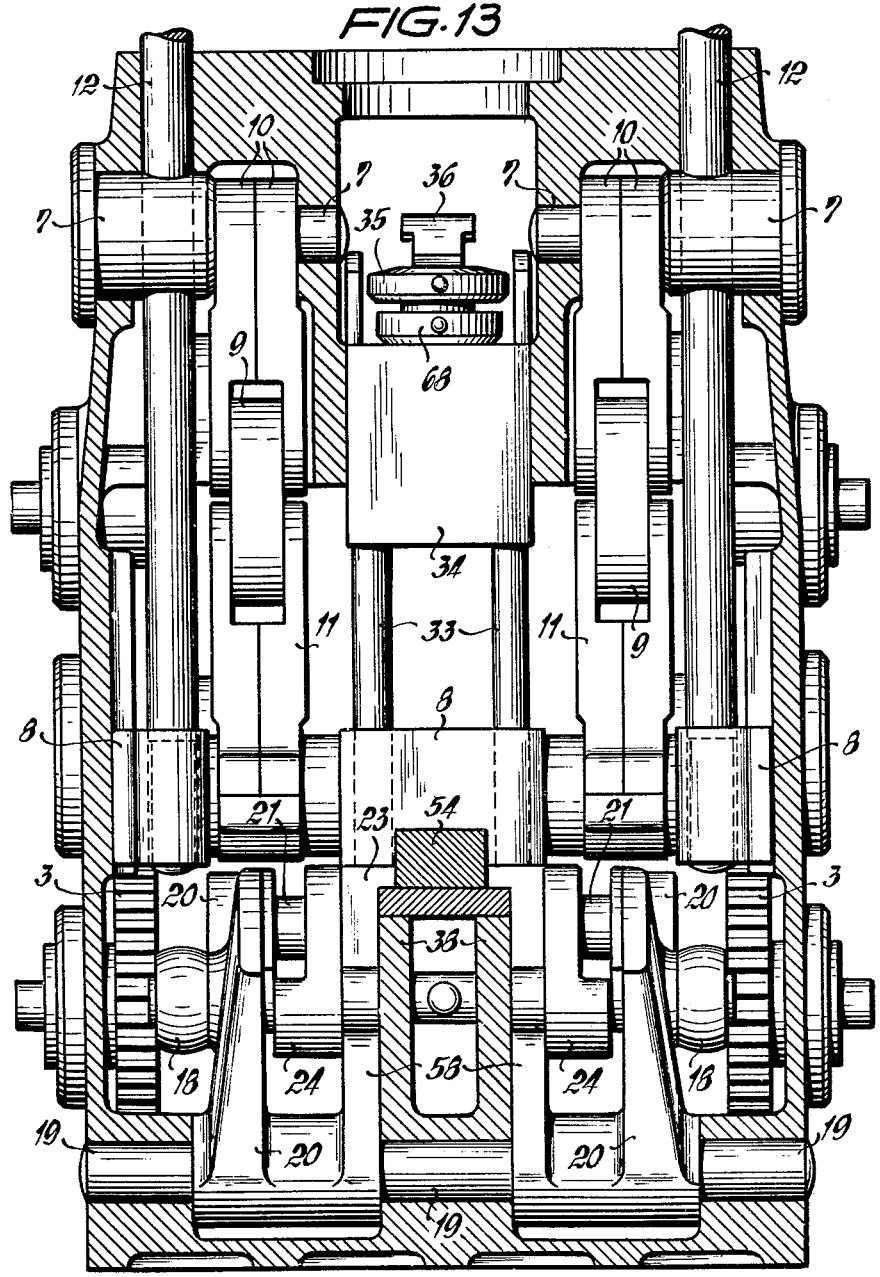
FIGURE 13 is a vertical frontal section through the machine housing, showing the toggle-operated cross piece in the pressing position and the withdrawing mechanism with its drive, and a section through the rough-pressing wedge with its stationary supporting bridge.

FIGURE 13 shows a frontal section of the arrangement of the toggle-joint with the toggle-operated cross piece 8 and the connecting rods 12 constituting the connection with the ram cross piece 13 of the machine, in their symmetrical disposition with respect to the machine axis. The wedge 54 and the divided supporting bridge 38 are shown in section. The withdrawing apparatus, comprising the withdrawing cross piece 23 and the adjusting block 34 connected thereto by the connecting rods 33, is mounted centrally for coupling the tool holder by means of coupling pin 36. The withdrawing apparatus is driven by the withdrawing mechanism which is mounted on pins 19 and disposed symmetrically on each side of the machine axis, this mechanism comprising the withdrawing levers 20, the sliding blocks 21 and the levers 24, the drive being transmitted through connecting rods 18.

A further feature of the invention is the use of replaceable press tool holders, which are fitted with tools of any construction outside the machine and can be interchanged in the machine in a very short time. FIGURE 16 is a section of a standard tool holder. This tool holder comprises a base plate 70 which is stationary and has guide faces, the tool casing 79 which is vertically displaceable and which is connected to the coupling plate 78 by two or more connecting rods 77 mounted for vertical movement in the base plate 70, and the ram holder 81 with adjustable aperture bearings 82, the ram holder being capable of carrying out travel movements over the length of the slide rods 80.

The coupling plate 78 and the ram holder 81 have T-shaped section pieces for their connection respectively to the withdrawing device and the ram of the machine. The casing plate 79 has a bore for receiving the press bushing 84, the securing of which can be carried out with any desired type of screw connection. The bore in the base plate 70 serves for receiving insertions for securing the stationary bottom tool die or dies 85. The press stem 86 is secured either direct or by means of an extension pin 87 by suitable means to the surface of the coupling plate 78 and can thus follow the vertical movement of the tool casing 79. The tool ram 83 attached to the ram holder 81 is maintained central in the press mold by the slide rods 80. FIGURE 17 gives a side view of the tool holder.

Tool holders with replaceable tools have been used for the first time in connection with the machine according to the invention. Hitherto, it has been usual to construct a special tool holder for each set of tools, such tool holder being known as a matrix. Such a matrix is specially made to suit the tool mold in question and thus constitutes a component of the non-replaceable tool. The making of complete matrices for the various briquettes is very costly and the working time required for their production considerably strains the capacity of the tool-making departments. When tool holders according to the invention are used, however, the cost of tools is very slight, since for each new briquette only the shaping tool parts, that is, the press bushing and the tool dies, and insertions and possibly additional securing means have to be specially made.

A further disadvantage involved in the use of matrices concerns their installation in the machine. The tool ram is usually secured to the machine ram direct. The matrix must then be placed on the machine table, aligned with the ram and secured by means of claws. The varying height of the matrix, which is always constructed to the dimensions of the associated briquettes, must be compensated by spacing means placed underneath the matrix. The attachment of the withdrawing rods of the matrix to the machine for effecting the movement of the tool is generally carried out with fixed screw connections to the withdrawing device of the machine. A subsequent adjustment of the pressing position of the tool can only be effected after removal of the screw connections, which often leads to skewing of the tool ram so that repeated alignment of the matrix with the ram after removal of the securing claws is necessary. Specialists are naturally required for carrying out these adjusting operations.

Figure 14:
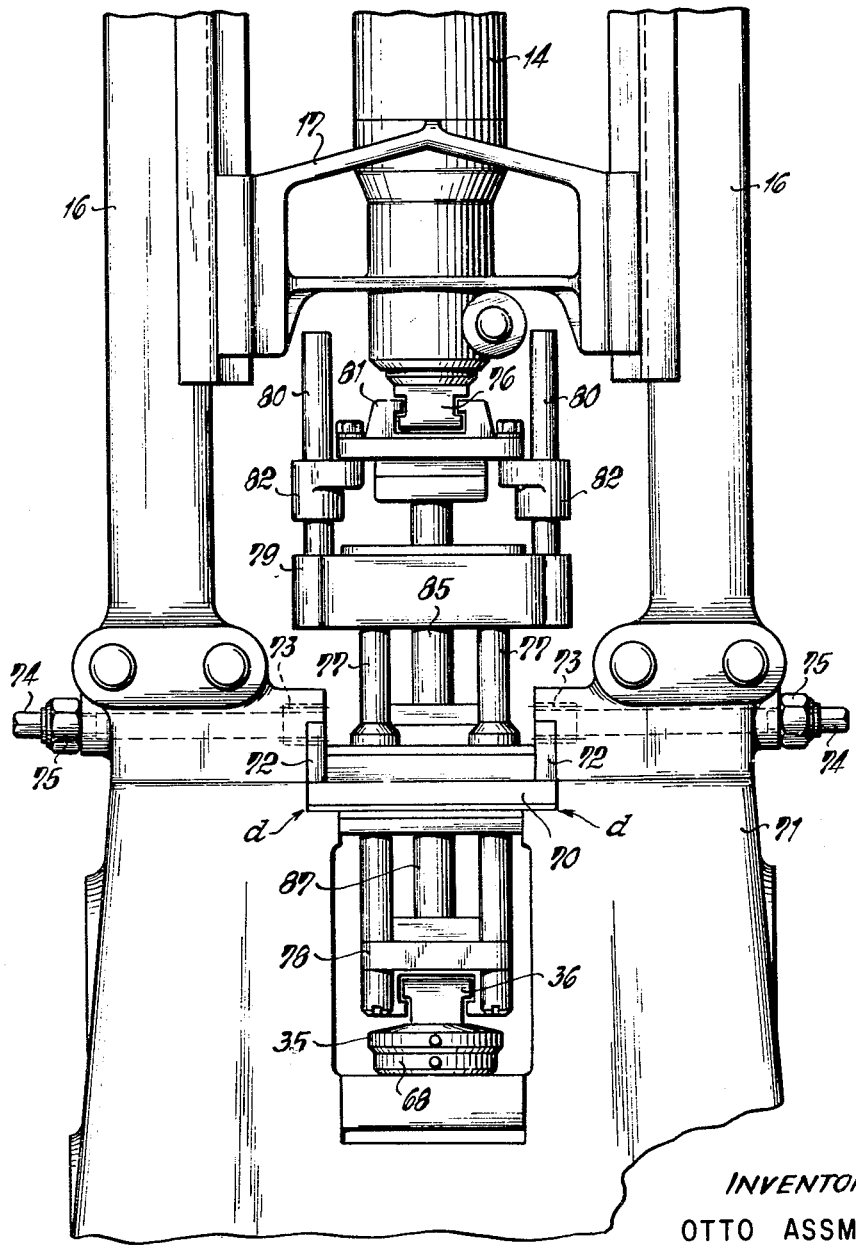
FIGURE 14 is a partial front view of the machine, showing the arrangement of the press tool holder, in particular the attachment of the base plate of the tool holder by means of toothed keys which are loaded by hand cranks acting through pins having gear wheel toothing, and the connection of the ram to the vertically movable tool casing.
Figure 15:
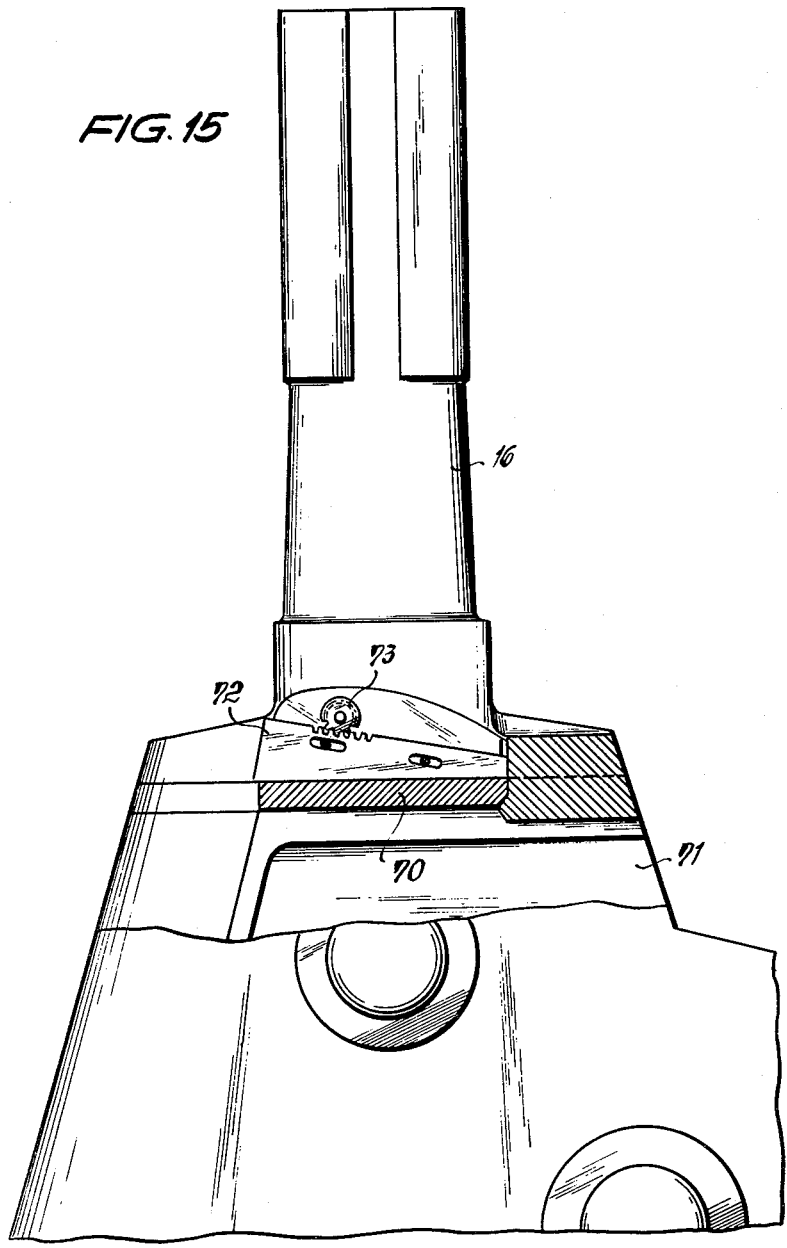
FIGURE 15 is a partial side section through the machine, showing the keys for the tool holder which are located at the side in the pillars of the machine, corresponding to the structure shown in FIGURE 14.

When the tool holder according to the invention is used, the disadvantages described above no longer occur. The sets of tools can be interchanged in a very short time. The vertical position of the tool casing 79 and thus the pressing position can be varied to suit the vertical dimensions of tool rams 85 and 86 present. The tool ram 83 is aligned by the ram holder 81 before being installed in the machine. The tool holder is equipped ready with the press tool outside the machine and, as is shown in FIGURE 14, is placed on two guide strips (d) of the machine table 71, which correspond to the tool plate 70, and pushed vertically under the ram of the machine. This produces positive coupling to the machine. The ram holder engages with the T-shaped thrust pin 76 of the machine ram and the coupling plate 78 engages with the T-shaped coupling pin 36 of the withdrawing device of the machine. These two couplings allow for horizontal displacement, but are free from play in the vertical direction. After the tool holder has been inserted, the base plate 70 is locked by two keys 72 which are located at the sides in the machine pillars 16 and which are tightened with pins 73 which are in mesh therewith and which are turned by means of a crank handle on pin 74. Final securing is effected by tightening nuts 75.

When the tool holder has been vertically set in its pressing position, the machine is ready for operation. This vertical setting is effected by raising or lowering the coupling pin 36. As shown in FIGURE 8, such adjustment is made possible by the provision in the adjusting block 34 of the screw-threaded bushing 35 with a right-hand thread and, in this bushing, of the coupling pin 36 with a left-hand thread of the same pitch. A square is milled on to the bottom end of the coupling pin 36 and this square is fitted in the inside square of the ring 67 which is secured against rotation in the adjusting block 34. By turning the screw-threaded bushing 35 it is possible to adjust the vertical position of the coupling pin 36 without the T-section turning. In this case the extent of the adjustment is equal to twice the pitch of the screw threads.

The vertical position of the tool ram 83 is varied, as shown in FIGURE 2, by raising or lowering the ram slide 17 which is vertically displaceable in the machine in guides in the pillars 16. The screw-threaded spindle 14 is guided in the bore of the ram cross piece 13 in a bushing which has worm-wheel toothing, so that the vertical adjustment is effected by turning the worm shaft with the pin 15 by means of a crank handle or power drive.

While we have, in the above description, disclosed a preferred embodiment of the present invention, it should be well understood that the invention is not restricted thereto and changes in the mechanical components or their arrangement may be carried out within the scope of specialist ability for improving the system. Further, while the aforesaid description is addressed to those skilled in the art and it is apprehended that the various features of the present invention will be perfectly clear to them, reference may be made to U.S. specification No. 2,844,858 if further elaboration of the general operation of briquette-making process is required. It will be appreciated, however, that the press of the instant invention differs mechanically in many respects from that disclosed in the aforesaid United States specification being designed for use with sintered metals as well as ceramics.

I claim:

1. In a press for making briquettes, a housing, a toggle-operated cross piece mounted for vertical reciprocating motion within said housing, a ram connected to said toggle-operated cross piece above said cross piece for motion therewith, said ram being provided with first coupling means for attachment to a press tool holder, a withdrawing cross piece located below said toggle-operated cross piece for abutment therewith during the pressing operation, said withdrawing cross piece being mounted for independent vertical reciprocating motion within said housing, second coupling means for attachment of said withdrawing cross piece to said press tool holder, a wedge horizontally displaceable between said toggle-operated cross piece and said withdrawing cross piece, means for displacing said wedge horizontally, a common main driving shaft operatively connected to said toggle-operated cross piece and to pivoted withdrawing levers for imparting separate but synchronous motions thereto, said withdrawing levers being arcuately reciprocable by said common main driving shaft about a fixed pivot axis, sliding blocks pivotally mounted on said withdrawing levers, further levers carrying said withdrawing cross piece and mounted for pivotal movement about an adjustable pivot point, said further levers having arcuate slide faces co-operating with said sliding blocks to impart said vertical reciprocating motion to said withdrawing cross piece, and spring means engaging said withdrawing cross piece for biasing said withdrawing cross piece upwards during the pressing operation.

2. A press according to claim 1, in which means are provided for raising said adjustable pivot point from a lower limiting position where said arcuate slide faces are concentric with said fixed pivot point of said withdrawing levers and withdrawing movement of said withdrawing cross piece is zero, to an upper limiting position corresponding to maximum withdrawing movement of said withdrawing cross piece.

3. A press according to claim 1, in which a supporting lever is connected to said withdrawing levers for arcuate reciprocating motion therewith, said supporting lever being disposed beneath said withdrawing cross piece to lock said withdrawing cross piece when in the pressing position but to release said withdrawing cross piece for withdrawing motion when said ram has passed through the pressing position.

4. A press according to claim 1, wherein means are provided for adjustably limiting the extent of horizontal displacement of said wedge to control rough-pressing from zero to a maximum value.

5. In a press for making briquettes, a housing, a toggle-operated cross piece mounted for vertical reciprocating motion within said housing, a ram connected to said toggle-operated cross piece above said cross piece for motion therewith, said ram being provided with first coupling means for attachment to a press tool holder, a withdrawing cross piece located below said toggle-operated cross piece for abutment therewith during the pressing operation, said withdrawing cross piece being mounted for independent vertical reciprocating motion within said housing, second coupling means for attachment of said withdrawing cross piece to said press tool holder, a wedge horizontally displaceable between said toggle-operated cross piece and said withdrawing cross piece, means for displacing said wedge horizontally, a common main driving shaft operatively connected to said toggle-operated cross piece and to pivoted withdrawing levers for imparting separate but synchronous motions thereto, said withdrawing levers being arcuately reciprocable by said common main driving shaft about a fixed pivot axis, sliding blocks pivotally mounted on said withdrawing levers, further levers carrying said withdrawing cross piece and mounted for pivotal movement about an adjustable pivot point, said further levers having arcuate slide faces co-operating with said sliding blocks to impart said vertical reciprocating motion to said withdrawing cross piece, spring means engaging said withdrawing cross piece for biassing said withdrawing cross piece upwards and acting with said sliding blocks and said slide faces during the return swing of said withdrawing levers to control return movement of said withdrawing device from the set withdrawing position to the pressing position, and guide rollers mounted on said withdrawing cross piece, said guide rollers co-operating with a guide path on said withdrawing levers during the continued return swing of said withdrawing levers to control return movements of said withdrawing device from the pressing position to the set filling position.

6. In a press for making briquettes, a housing, a toggle-operated cross piece mounted for vertical reciprocating motion within said housing, a ram connected to said toggle-operated cross piece above said cross piece for motion therewith, said ram being provided with first coupling means for attachment to a press tool holder, a withdrawing cross piece located below said toggle-operated cross piece for abutment therewith during the pressing operation, said withdrawing cross piece being mounted for independent vertical reciprocating motion within said housing, second coupling means for attachment of said withdrawing cross piece to said press tool holder, a wedge horizontally displaceable between said toggle-operated cross piece and said withdrawing cross piece, means for displacing said wedge horizontally, stop means for adjustably limiting the extent of horizontal displacement of said wedge to control rough-pressing from zero to a maximum value, spring means operatively connected to said wedge for biassing said wedge horizontally outwards between said toggle-operated cross piece and said withdrawing cross piece against said stop means with a force less than the maximum force exerted by said toggle-operated cross piece and said ram during pressing, a common main driving shaft operatively connected to said toggle-operated cross piece and to said withdrawing cross piece for imparting separate but synchronous motions thereto, and further spring means biassing said withdrawing cross piece upwards during the pressing operation against said wedge and said toggle-operated cross piece.

7. In a press for making briquettes, a housing, a toggle-operated cross piece mounted for vertical reciprocating motion within said housing, a ram connected to said toggle-operated cross piece above said cross piece for motion therewith, said ram being provided with first coupling means for attachment to a press tool holder, a withdrawing cross piece located below said toggle-operated cross piece for abutment therewith during the pressing operation, said withdrawing cross piece being mounted for independent vertical reciprocating motion within said housing, second coupling means for attachment of said withdrawing cross piece to said press tool holder, a wedge horizontally displaceable between said toggle-operated cross piece and said withdrawing cross piece, means for displacing said wedge horizontally, said toggle-operated cross piece having part of its lower surface inclined to co-operate with an upper inclined surface of said wedge, a hammer keyed to said wedge to allow vertical movement of said wedge over a co-operating vertical face of said hammer, a fixed bridge beneath said wedge, said bridge being divided to allow passage of said withdrawing cross piece therethrough, stop means for adjustably limiting the extent of horizontal displacement of said wedge to control rough-pressing from zero to a maximum value, spring means engaging said withdrawing cross piece for biassing said wedge horizontally outwards between said toggle-operated cross piece and said withdrawing cross piece against said stop means with a force less than the maximum force exerted by said toggle-operated cross piece and said ram during pressing, a common main driving shaft operatively connected to said toggle-operated cross piece and to said withdrawing cross piece for imparting separate but synchronous motions thereto, and further spring means biassing said withdrawing cross piece upwards during the pressing operation against said wedge and said toggle-operated cross piece.

8. In a press for making briquettes, a housing, a toggle-operated cross piece mounted for vertical reciprocating motion within said housing, a ram connected to said toggle-operated cross piece above said cross piece for motion therewith, an interchangeable press tool holder with a base plate, guides on said housing for receiving said base plate, means for removably fixing said base plate of said press tool holder in position on said guides, first vertically adjustable coupling means for coupling said ram to said press tool holder, a withdrawing cross piece located below said toggle-operated cross piece for abutment therewith during the pressing operation, said withdrawing cross piece being mounted for independent vertical reciprocating motion within said housing, second vertically adjustable coupling means for coupling said withdrawing cross piece to said press tool holder, a wedge horizontally displaceable between said toggle-operated cross piece and said withdrawing cross piece, means for displacing said wedge horizontally, a common main driving shaft operatively connected to said toggle-operated cross piece and to said withdrawing cross piece for imparting separate but synchronous motions thereto, and spring means engaging said withdrawing cross piece for biassing said withdrawing cross piece in an upward direction.

9. A press according to claim 8, in which said interchangeable press tool holder comprises a base plate, a tool casing connected through rods passing through said base plate to a coupling plate, said coupling plate being shaped to engage said second vertically adjustable coupling means, a ram holder shaped to engage said first vertically adjustable coupling means, and slide rods on said tool casing, said ram holder being centred with respect to said tool casing by means of bearings in said ram holder engaging said slide rods to permit relative vertical movement between said ram holder and said tool casing.

References Cited in the file of this patent
UNITED STATES PATENTS

| | | |
|---|---|---|
| 2,932,063 | Belden et al. | Apr. 12, 1960 |

FOREIGN PATENTS

| | | |
|---|---|---|
| 509,997 | France | Aug. 28, 1920 |
| 582,696 | Germany | Aug. 21, 1933 |
| 701,772 | Germany | Jan. 23, 1941 |
| 441,790 | Great Britain | Jan. 27, 1936 |